June 6, 1939.  E. A. MURPHY ET AL  2,161,308
MANUFACTURE OF GOODS OF SPONGELIKE OR CELLULAR RUBBER
Filed Dec. 10, 1937  2 Sheets-Sheet 1

Inventors
Edward Arthur Murphy
Albert Arthur Round
Thomas Trorcross
by Benj. T. Rauber, their attorney

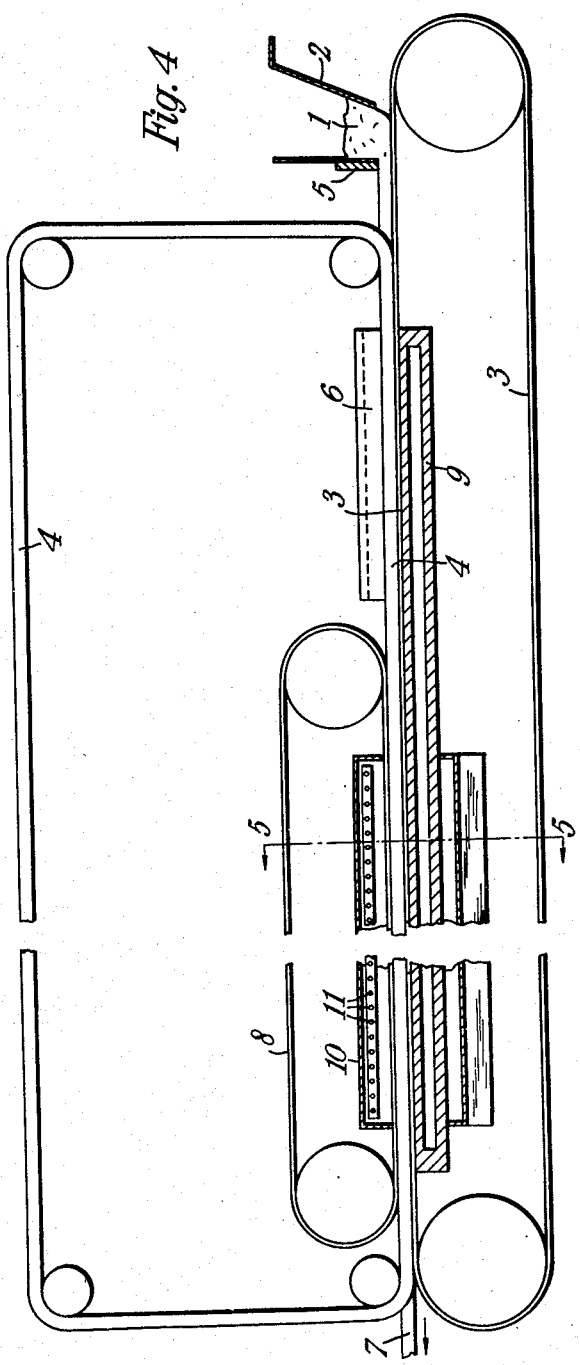

Patented June 6, 1939

2,161,308

UNITED STATES PATENT OFFICE 2,161,308

MANUFACTURE OF GOODS OF SPONGELIKE OR CELLULAR RUBBER

Edward Arthur Murphy, Wylde Green, and Albert Arthur Round and Thomas Norcross, Erdington, Birmingham, England, assignors to Dunlop Rubber Company, Limited, London, England, a British company Application December 10, 1937, Serial No. 179,042
In Great Britain December 18, 1936

7 Claims. (Cl. 18—53)

This invention comprises improvements in or relating to the manufacture of goods of spongelike or cellular rubber, or similar material, from emulsions or dispersions of the kinds hereinafter specified, and more particularly in the production of the said material in sheet or moulded form.

A process is disclosed in British patent specification No. 422,171, for the production of artificial sponge in sheet form by setting or solidifying foam of solutions or dispersions of artificial sponge-forming substances upon an upwardly open stratum characterized in that after setting or solidification of the foam the sponge sheet is subjected to pressure and the compressed product fixed while in the compressed condition.

In the manufacture of wide sheet using a pressure surface as therein described, it has been found difficult to avoid air pockets, when the pressure surface such as a plate or belt covers a large area of set froth. At such places, the sheet shows irregular surface markings and in addition, does not conform to the required thickness.

Our invention provides an improved process for the production of spongy or cellular rubber goods prepared from frothed aqueous emulsions or dispersions of rubber or similar material in sheet or moulded form, wherein air pockets are avoided and a uniform thickness of product is obtained.

According to the present invention, an improved process for the production of spongy or cellular rubber goods prepared from frothed aqueous emulsions or dispersions of rubber or similar material of the kinds hereinafter specified in sheet or moulded form comprises setting or solidifying the said froth upon an upwardly open stratum or an upwardly open mould, subjecting the set froth to pressure applied by a perforated surface, and vulcanizing the set froth in the thus compressed condition.

After setting, the froth is found to be slightly thicker than before and to have an upper convex surface, the increase in thickness being greater in the centre than at the sides. Preferably, the pressure which is applied by the perforated surface suffices to compress the set froth to the original thickness of the froth prior to setting.

The invention is particularly applicable to the manufacture of sponge-like or cellular rubber sheet in a continuous manner, the perforated pressure surface then taking the form of, for example, a perforated belt of the type hereinafter described.

In the moulding of sponge-like or cellular rubber articles it is known to apply a top cover plate containing spew holes to froth prior to setting. In this case, if the spew holes are adequately located, a product is obtained, which is free from the surface blemishes due to air pockets but there necessarily results a considerable amount of waste, on account of the extrusion of the froth through the spew holes. Waste of this description may form an appreciable percentage of the volume of the final product particularly when its thickness is small relative to its area.

It has been found that the application of pressure applied by a perforated surface after the froth has been set but before the product has been vulcanized obviates all danger of air pockets and the consequent irregular surface markings, and the set froth is thus accurately maintained at the desired gauge during vulcanization, despite any disturbing influences, such as the tendency of the set froth to collapse. The set froth is readily deformable and may be compressed to the required gauge. Unlike a fluid froth, it does not spew through the perforations, but becomes lightly attached to the perforated pressure surface on account of the slight swelling of the material through the perforations of the pressure surface. The consequent markings are regularly spaced over the whole of the surface, but the mean gauge over any cross-section is substantially uniform.

In order to obtain the optimum result, it would appear that the perforations in the pressure surface should be uniformly distributed in order to allow for the free escape of air; the area of the perforations should be as large as possible consistent with the rigidity of the pressure surface, in order to prevent the set froth from rising unduly through the openings; and the edges of the perforations should be as long as possible, in order to obtain maximum attachment of the set froth to the pressure surface during vulcanization. It would further appear that the perforated pressure surface must be sufficiently strong and rigid or must be adequately located throughout its length, so that it gives the set froth a substantially uniform gauge during vulcanization.

The various features of the invention are illustrated by way of example in the accompanying drawings, in which—

Fig. 4 is a diagrammatic side elevation of apparatus for the production of rubber-sponge sheet in continuous lengths.

Figure 2:
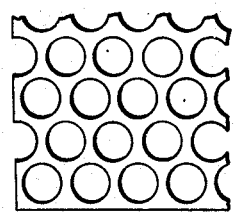
Figs. 1 to 3 illustrate examples of perforated surfaces suitable for use in carrying out the process of our invention.
Figure 1:
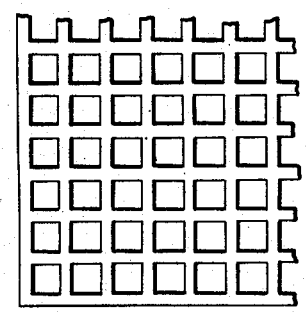
Figure 3:
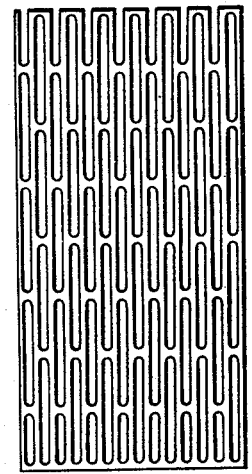

In the embodiment of the invention illustrated in Figs. 1, 2 and 3 of the accompanying drawings, Fig. 1 illustrates a perforated surface provided with square perforations. These perforations may be of any suitable size. Perforations ¼ inch square and of a pitch, that is, the distance from center to center parallel to the sides of the squares of approximately 11/32 of an inch, thus leaving 1/16 inch space between the squares or openings.

Fig. 2 illustrates a perforated surface having round perforations. These perforations preferably have a diameter of approximately 11/32 of an inch, and a pitch or distance from center to center of about ⅜ of an inch, thus giving a minimum width between openings of 1/16 of an inch.

In the modification shown in Fig. 3 the surface is provided with staggered or alternate slots having rounded ends. The slots may have a total length of approximately 1⅞ inches and a width of 1/16 of an inch, the width between the openings being approximately 1/16 of an inch.

Figure 5:
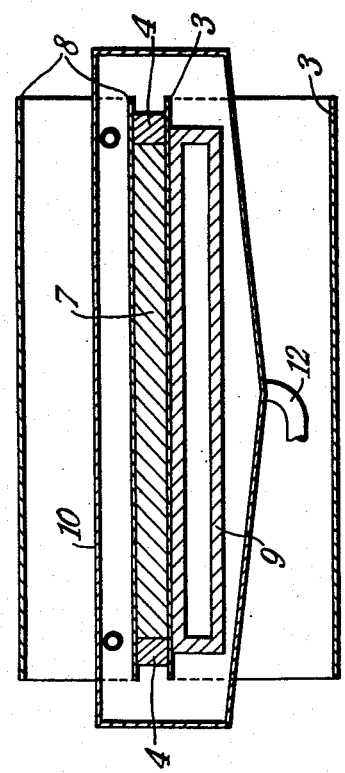
Fig. 5 is a vertical section on the line 5—5 of Fig. 4.

In carrying on the process with the apparatus shown in Figs. 4 and 5, froth 1 is transferred from a hopper 2 onto an endless traveling belt 3 which is provided with side walls in the form of endless rubber bands 4 of substantially the same thickness as that of the final rubber-sponge sheet. The froth is distributed over the belt to a definite gauge in known manner by means of a spreading knife 5. The belt then passes through the hot gelling tunnel 6 to set the froth. The resulting coagulated froth 7 is generally slightly thicker than before and has an upper convex surface, the increase in thickness being much greater in the center than at the sides of the belt.

The traveling belt 3 and the coagulated product 7 then pass under a perforated traveling belt 8 which travels at the same linear speed as the traveling belt 3. The distance between the two belts 3 and 8 is such that the sponge material 7 is compressed to its original thickness, that is, the gauge imparted by the spreading knife 5. The froth then passes into a vulcanizing chamber. The vulcanizing may be carried out by any known means, but it is preferable to employ the method described in co-pending application Serial No. 179,054. The vulcanizing chamber therefore consists of a steam heated chest 9 and a top cover 10, and steam is passed through jets 11 onto the surface of the sponge sheet 7. The water which condenses in the vulcanizing chamber is removed through the drain pipe 12.

The frothed aqueous emulsions which may be employed for the present invention may be prepared in accordance with the processes described and claimed in any of the following British patent specifications Nos. 332,525 (United States Patent No. 1,852,447) 332,526 and 431,410, and the aqueous emulsions or dispersions, which may be employed, comprise those therein defined.

A particular method of carrying out the invention for the production of rubber sponge sheet will now be described.

A froth of required density is prepared from a heat sensitized aqueous rubber dispersion, in accordance with the process described in British patent specification No. 332,525. The froth is transferred from a hopper onto an endless travelling belt, which is provided with side walls in the form of rubber bands, which have substantially the same thickness as that of the final sheet. The froth is distributed over the belt to a definite gauge in known manner, as by means of a spreading knife. The belt passes through a hot gelling tunnel to set the froth. The coagulated froth is found to be slightly thicker than before and to have an upper convex surface, the increase in thickness being greater in the centre than at the sides of the belt.

The travelling belt and the coagulated product pass under a perforated surface travelling at the speed of the travelling belt, the distance between the two travelling surfaces being so spaced that the sponge material is compressed to its original thickness, namely, the gauge imparted by the spreading knife. The set froth passes into a vulcanizing chamber. The vulcanization may be carried out in any known manner, for example, by conducting the coagulated product through a hot water bath or by employing the method described and claimed in the co-pending application.

Plain or articulated travelling belts may be employed.

By employing travelling belts, which are suitably engraved or embossed, or which are articulated, it is possible to manufacture shaped sponge or cellular products, such as for example ribbed or cavitied rubber sheet.

The invention may further be applied to the continuous production of moulded sponge-like or cellular rubber articles, by transferring the froth from the hopper into moulds attached contiguously to the travelling belt. The moulds containing the froth are conducted under a scraper knife to remove excess froth, and the subsequent setting and vulcanization of the froth are carried out in the manner described above.

Another embodiment of the invention is the production of individually moulded articles, such as are employed for upholstery purposes. In such a manufacture, for example, after the froth has been poured into an upwardly open mould, it is adjusted to the level of the upper surface of the mould and set. A perforated plate is clamped onto the mould, so that the set froth is compressed to its original level, and the froth is vulcanized in known manner.

Having now particularly described our invention, we claim—

1. An improved process for the production of spongy or cellular rubber goods prepared from frothed aqueous emulsions or dispersions of rubber or similar material of the kinds hereinbefore specified in sheet or moulded form which comprises setting or solidifying the said froth upon an open structure, subjecting the set froth to the pressure of a perforated surface, and vulcanizing the set froth in the thus compressed condition.

2. A process as claimed in claim 1, wherein the froth swells during setting from its original unset thickness and wherein the pressure applied by the perforated surface suffices to compress the set froth to the original thickness of the froth prior to setting.

3. A process for the production of sponge or cellular rubber goods from frothed aqueous emulsions of rubber and similar material which comprises setting a froth of foamed rubber latex, supporting said set froth on an open structure and subjecting the open faces of said froth to the pressure of a perforated surface and vulcanizing the froth under said compression.

4. A process for forming sheets of cellular rubber which comprises spreading a foamed aqueous dispersion of rubber material onto a supporting surface to a predetermined gauge or thickness, setting said foamed dispersion and pressing the upper surface of said dispersion with a perforated surface and vulcanizing said dispersion under said compression.

5. A process of forming articles of cellular rubber which comprises filling liquid moulds with foamed aqueous dispersions of rubber material, setting said foamed material in said moulds, compressing said set foam with a perforated compressing surface and vulcanizing said foam under said compression.

6. A process of forming continuous sheets of cellular rubber which comprises spreading a foamed aqueous dispersion of rubber onto a continuously travelling belt surface, gelling the layer of a foamed material on said surface and compressing the gelled foam layer by the pressure of a perforated surface.

7. The process of forming cellular rubber which comprises compressing an unvulcanized cellular rubber article with the pressure of a perforated surface applied to a surface of said unvulcanized cellular rubber and vulcanizing said cellular rubber structure under said pressure.

EDWARD ARTHUR MURPHY.
ALBERT ARTHUR ROUND.
THOMAS NORCROSS.